United States Patent Office 3,470,428
Patented Sept. 30, 1969

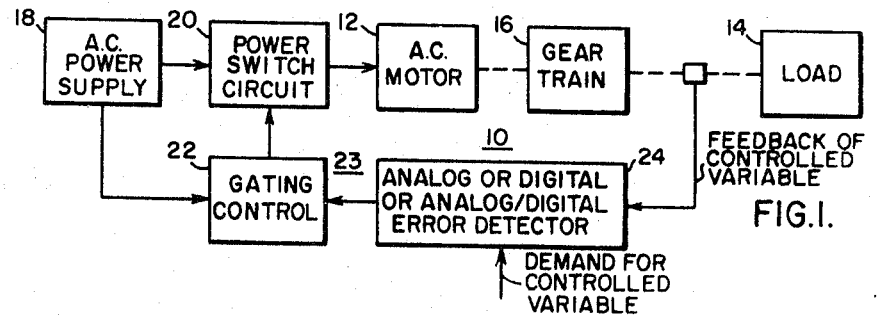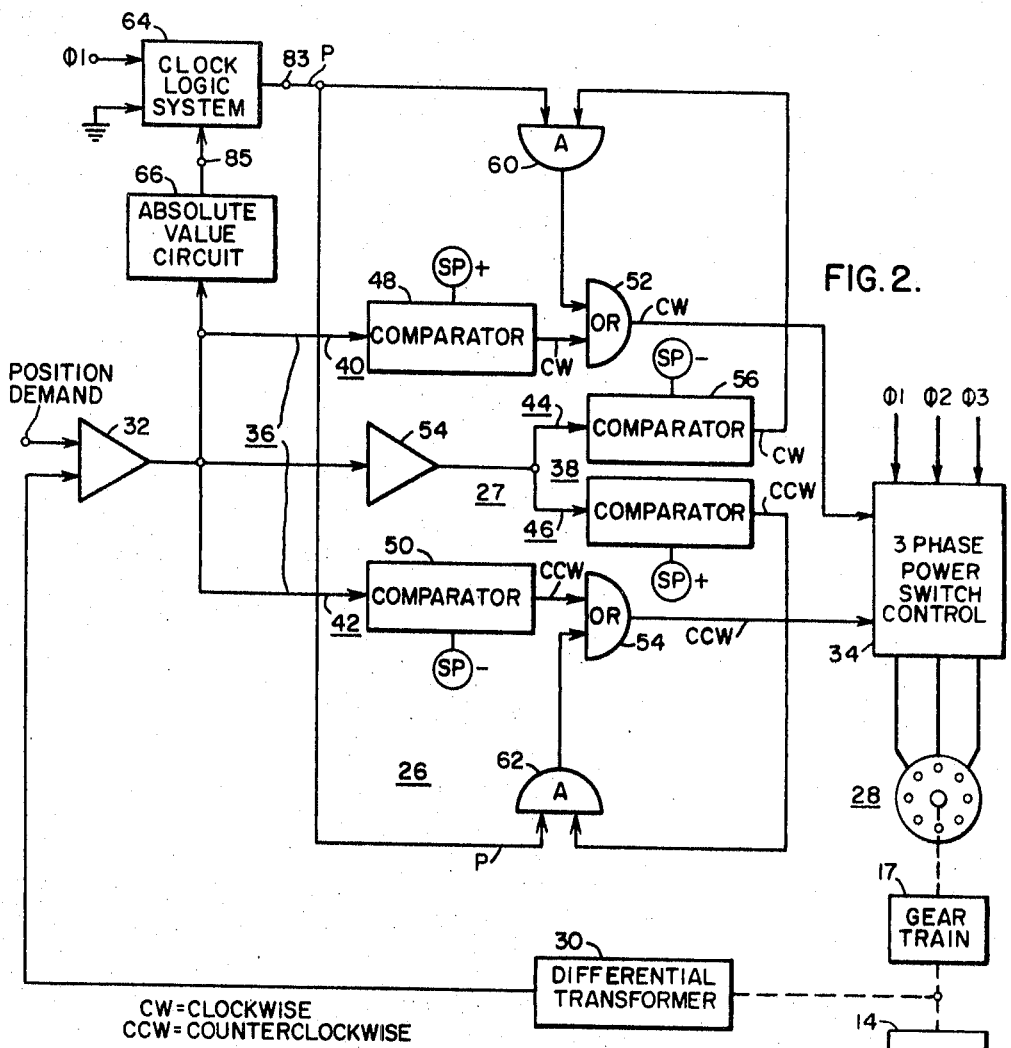

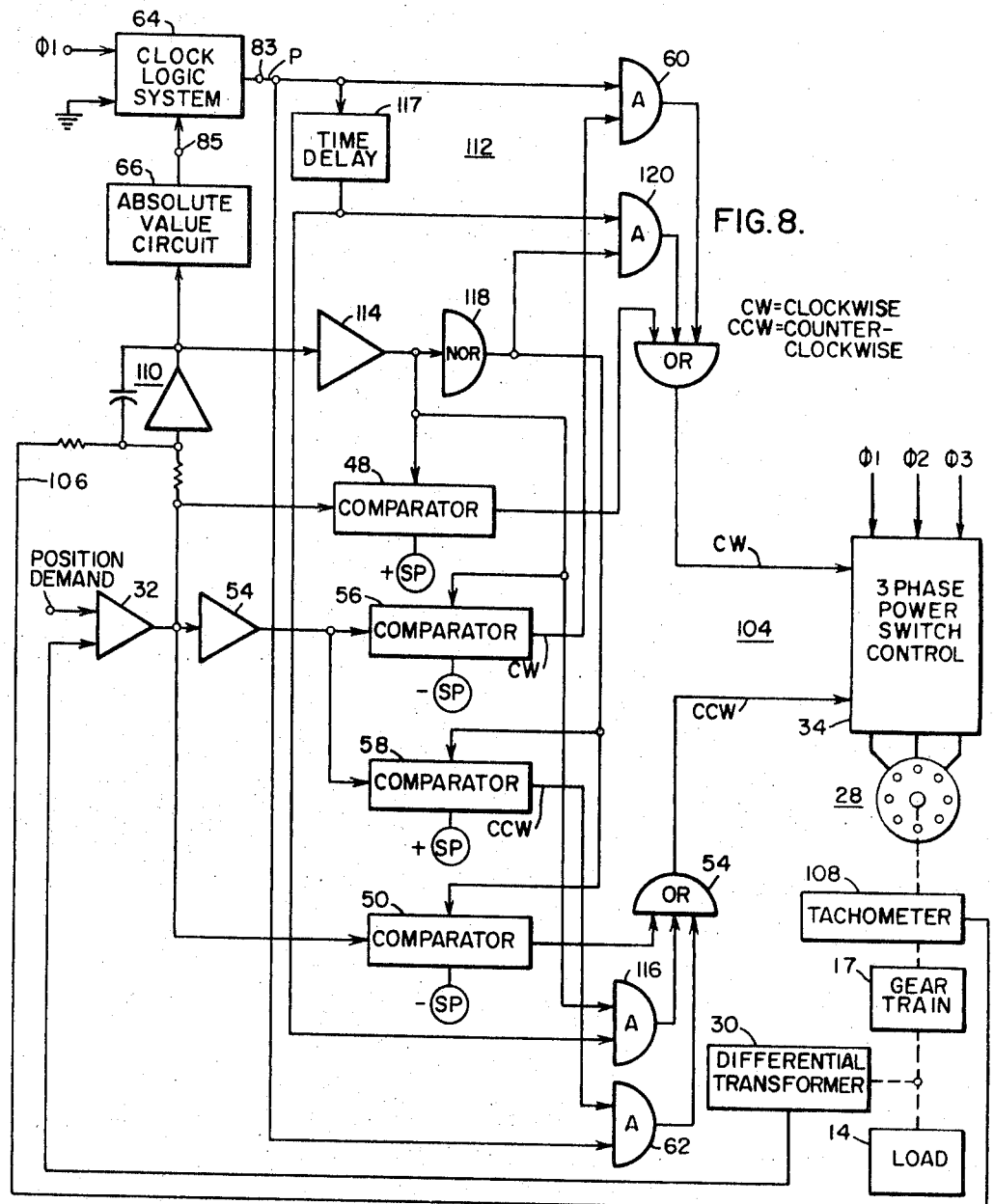
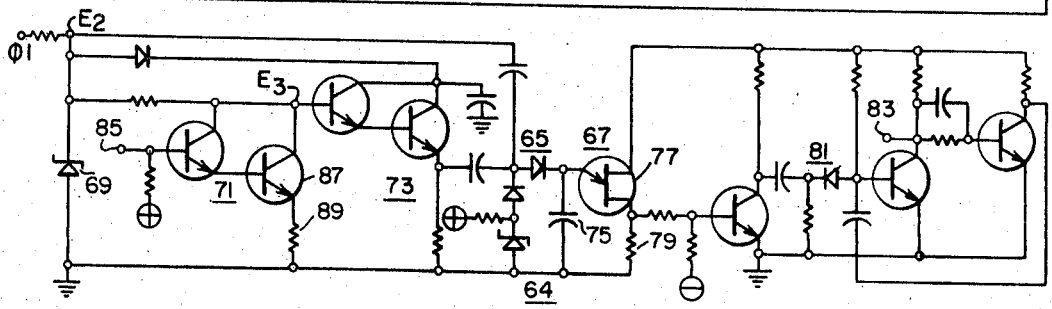

3,470,428
ALTERNATING CURRENT MOTOR CONTROL SYSTEM PARTICULARLY FOR POSITION REGULATING APPLICATIONS
Joseph Gill, Bridgeville, and George Rouvalis, Pittsburgh, Pa., assignors, by mesne assignments, to Westinghouse Electric Corporation, Pittsburgh, Pa., a corporation of Pennsylvania
Filed Jan. 20, 1966, Ser. No. 521,931
Int. Cl. H02p 5/46, 7/68, 7/74
U.S. Cl. 318—18                    10 Claims

ABSTRACT OF THE DISCLOSURE

A three phase induction motor is position controlled or position and velocity controlled by means of solid state switches which apply full supply voltage cycles to the motor at varying rates dependent on the position error or the position error and velocity error. A pulse generator is controlled to generate pulses synchronously with supply voltage cycles for gating control of the solid state switches.

Background of the invention

The present invention relates to alternating current motor control systems and more particularly to position regulating alternating current motor systems.

Generally, there are varied applications in which a motor is controlled to regulate load speed or position or both load speed and load position. For example, a position regulating motor can be connected to regulate the position of a valve or an air damper in a process control system.

Power switch devices such as thyristors or silicon controlled rectifiers are commonly employed to control the time function of motor energization which in turn determines the load speed or position. To regulate the effective voltage and energy applied to an alternating current motor or a direct current motor, it is common to employ gating circuitry which varies the switch or thyristor firing angle in an alternating supply voltage waveform. Substantial net advantages in reduced user capital costs and reduced user maintenance costs can be obtained in many applications with the use of alternating current and especially three-phase squirrel cage induction motor control systems as compared to direct current motor control systems if the control has satisfactory or comparatively improved performance characteristics.

For comparison purposes, the performance of a motor control generally is evaluated on the basis of important operating characteristics including the speed and stability and accuracy with which corrective response is achieved. Since certain system parameters conflictingly affect the significant performance characteristics, the overall performance of a motor control is characterized with a design balance among the performance characteristics. Overall performance improvement accordingly requires improvement in the performance balance. However, certain individual performance characteristics can be improved to increase the utility of a motor control in particular applications without any substantial general improvement or possibly even with diminished general utility in the motor control.

In position regulating motors, resolution and smoothness of response are also important performance characteristics for evaluation purposes. Percent resolution is defined as the smallest controllable change in position divided by the total distance in the range of movement times one hunderd. High resolution or low percent resolution accordingly is desirable for positioning accuracy, but increasingly higher resolution requires increasingly higher system gain which can conflictingly lead to position overshoot or system instability unless system response speed is compromised to an unsatisfactorily low value. Smooth response is desirable for reasons including avoidance of excessive dynamic forces on the motor and load. The extent to which smoothness is achieved is determined by the time varying character of the motor drive torque as the load is controllably brought to position.

Summary of the invention

In accordance with the broad principles of the present invention, a novel and reliably operable alternating current motor control system is arranged to provide individual and overall improvements in motor control performance characteristics and in particular position regulating motor control performance characteristics. In smoothly and accurately controlling the motor output with fast and stable response, an analog or analog/digital feedback system preferably controls the rate at which pulses and preferably "full" pulses of an alternating supply voltage waveform are applied to an alternating current motor.

A power switch circuit, preferably characterized with solid state switching, applies the supply voltage pulses to the alternating current motor. Power switch gating is in turn controlled by gating circuitry which is controlled by a feedback error signal to generate gating pulses at a rate determined by the error magnitude. It is preferred that the control system be embodied as a position regulator and, in certain position regulating applications, a velocity control loop is combined with the position feedback control so that the gating pulse rate is controlled to produce position regulation at a rate independent of the motor load characteristics.

It is therefore an object of the invention to provide a novel motor control system which provides improved motor control economy and particularly improved position regulating motor control economy by making the use of alternating current and particularly three-phase induction motors commercially acceptable in a wider field of application.

Another object of the invention is to provide a novel alternating current motor control system which provides overall improvement in motor control performance and particularly in position regulating motor control performance.

A further object of the invention is to provide a novel alternating current motor control system and particularly a novel position regulating alternating current motor control system which provides improved response speed and stability characteristics.

An additional object of the invention is to provide a novel alternating current motor control system and particularly a novel position regulating alternating current motor control system which provides improved operating accuracy.

It is another object of the invention to provide a novel position regulating alternating current motor control system which operates with materially improved resolution consistently with fast, smooth and stable response.

It is a further object of the invention to provide a novel position regulating alternating current motor control system which operates both relatively high and relatively low inertia motors with improved smoothness.

It is an additional object of the invention to provide a novel velocity controlled position regulating alternating current motor control system which produces position regulation at a rate substantially independent of motor load characteristics and with individual and overall improvements in performance characteristics including resolution and smoothness.

These and other objects of the invention will become more apparent upon consideration of the following detailed description along with the attached drawings.

Brief description of the drawings

FIGURE 1 shows a block diagram of an alternating current motor control system arranged in accordance with the principles of the invention;

FIG. 2 shows a more specific schematic diagram of a position regulating alternating current motor control system arranged in accordance with the principles of the invention;

FIG. 8 shows a schematic diagram of a velocity controlled position regulating alternating current motor control system arranged in accordance with the principles of the invention;

FIG. 10 shows an exemplary circuit form of a clock logic system employed in the systems of FIGS. 2 and 8.

Description of the preferred embodiment

Figure 3A:
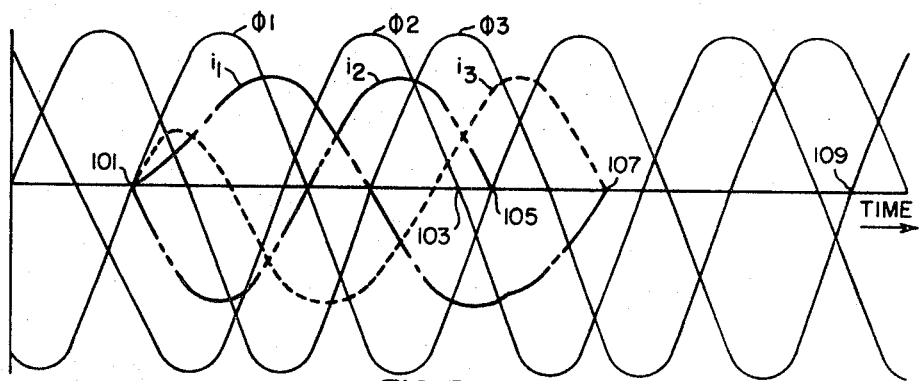
FIGS. 3A and 3B show typical three-phase supply voltage waveforms.

More specifically, in FIG. 1 there is shown an alternating current motor control system 10 arranged in accordance with the principles of the invention to operate a load 14 driven by an AC motor 12 through a gear train 16. The AC motor 12 can be any suitable alternating current dynamoelectric machine but preferably is a three-phase squirrel-cage induction motor. Direct coupling of the AC motor 12 and the load 14 can be employed if desired, but the gear train 16 is preferably employed in position regulating applications and in other applications where the load 14 is to be driven at a speed different from the motor operating speed.

Motor torque is developed by energization derived from an AC power supply 18 through a power switch circuit 20. To control the drive torque and the operation of the load 14, the time function of voltage or the effective voltage applied to the AC motor 12 through the power switch circut 20 is varied by controlling the rate at which pulses of the AC supply voltage waveform are applied to the motor 12.

A feedback system 23 includes a gating control 22 having a variable rate pulse generator and other circuitry connected to control the power switch gating which in turn controls the motor energization pulse rate. The successive motor pulses preferably are "full" to achieve good drive torque even at low motor energization pulse rates. The successive motor pulses further are preferably substantially equal in duration to produce successive substantially equal torque pulses on the motor shaft.

By "full pulse," it is meant herein to refer to a voltage pulse having a time duration about equal to or greater than a half period of the supply voltage waveform. In the 60-cycle power system, a full motor pulse therefore is a supply voltage pulse having a duration of application to the motor equal to about $\frac{1}{120}$ of a second or more. A full motor pulse can begin at any time point in the supply voltage waveform but preferably is begun at a zero crossover point.

In multiphase systems including the preferred case where the AC motor 12 is a three-phase induction motor and three-phase motor voltage control is provided, a "full motor pulse" has reference to a supply voltage pulse comprising all of the phase voltages and having a time period of application to the motor about equal to or greater than a half period of the supply voltage waveform. The term "full pulse" is also intended to refer to cases where at least one of the phase voltages is applied to the motor for a time period about equal to or greater than one-half period of the supply voltage waveform and the other phase voltage or voltages are applied to the motor for the same or a different time duration either in phase with or phase delayed from the one phase voltage application.

It is preferred that a full pulse begin at a zero crossover point in one of the phase voltage waveforms. The term "about" is used in the definition of a full pulse to distinguish full pulse control from firing angle control while encompassing minor variations in voltage application time including that resulting from the fact that thyristor or power switch gating at the zero crossover or other gating phase point may not result in switch firing precisely at the gating phase point but can instead result in switch firing at a slightly later phase point depending upon particular switch characteristics.

The feedback system 23 further includes an error detector 24 which determines the difference between the amplitude of a feedback signal and a demand signal for the controlled load variable, such as load position or speed. The system 23 can be in the form of analog circuitry or a commercially available and suitably programmed digital device (not shown) with suitable input and output conversion equipment (not shown). However, it is preferably in the form of analog/digital circuitry.

The amplitude of the error signal controls the gating control 22 and in turn the power switch gating rate and the rate at which full voltage supply pulses are applied to the motor 12 in driving the load variable to the demand value. The maximum switch gating rate preferably occurs for all position errors above a predetermined value, and at the maximum gating rate the supply voltage waveform is continuously applied to the motor 12 so as to produce maximum motor velocity or speed. For lower error values, the switch gating rate is decreased to produce lower motor speed. The separate feedback operating ranges are preferably produced by multiple feedback control loops as described in connection with FIG. 2, but other schemes can be employed to reach similar end results.

In the preferred position regulating application, the controlled load variable is the load position and the rate at which full supply voltage pulses are applied to the motor 12 accordingly diminishes toward zero as the load 14 is brought to the demand position. If the load 14 is directionally imbalanced, as is often the case for air dampers or the like, the gear train 16 preferably includes an anti-back drive device such as a double worm gear (not shown) to prevent the load 14 from back-driving the motor 12 when the demand position is reached. However, if standard spur gearing is employed, the load 14 can be locked in position by suitable DC energization or static braking of the motor 12.

There is shown in greater detail in FIG. 2 a position regulating AC motor control system 26 arranged in accordance with the principles of the invention. Drive power is provided by an economic three-phase squirrel-cage induction motor 28 through a gear train 17 which provides for accurate positioning within a reasonably attainable range of system gain and which includes double worm gearing to prevent back drive from the load 14. The three-phase squirrel-cage induction motor 28 can, for example, be a totally enclosed 8-pole, 220 volt, 900 r.p.m. motor having a power rating in the range of $\frac{1}{3}$ to 2 horsepower and having high slip and Nema D speed-torque characteristics.

In feedback system 27, a differential transformer 30 or other suitable indicating device such as a potentiometer (not shown) is coupled to the load 14 and produces a signal representative of load position. A position demand signal and the actual load position signal are coupled to the input of a standard high gain operational amplifier 32 such as a commercially available high gain DC transistorized amplifier having gain control. The output of the amplifier 32 is an error signal representing the difference between the demand and actual position signals. If desired, the demand signal can be manually set or it can be produced by an automatic controller (not shown) which forms a part of an overall process control system (not shown) in which the position motor 28 and the load 14 are used. If the load 14 has physical limits of movement, suitable constraint circuitry (not shown) can be employed to prevent feedback operation which would tend to drive the load 14 outside the constraint boundaries.

The error signal is used to control the energization of the AC motor 28 through a three-phase power switch control 34. To provide high system response speed and high system resolution consistently with system stability without overshoot, the feedback control loop is preferably divided into different error level branches, preferably a higher error-higher velocity branch 36 and a lower error-lower velocity branch 38 which are respectively further subdivided into clockwise and counterclockwise rotational direction branches 40, 42 and 44, 46. Thus, feedback controlled velocity reduction as position error is reduced permits fast and stable response at high system gain and accordingly contributes materially to improved system resolution. The amplitude of the error signal determines whether the higher error-higher velocity loop 36 is operative, and the sign of the error signal determines whether the clockwise branch 40 or 44 or the counterclockwise branch 42 or 46 is operative in the higher and lower error loops 36 and 38.

In the higher error feedback control loop 36, a standard comparator circuit 48, such as a NOR transistor package, is connected in the clockwise branch 40 and a standard comparator circuit 50 is connected in the counterclockwise branch 42. Both comparators 48 and 50 are commonly coupled to the output of the amplifier 32. The set point voltage for each comparator 48 or 50 is preselected in reference to the known total range of position error voltages so as to control the range of higher position errors over which it is desired to obtain higher velocity correction. For example, the set point voltage for the comparator 48 can be +4 volts and the set point voltage for the comparator 50 can be −4 volts.

When the error voltage from the common error amplifier 32 is negative and in excess of the positive set point voltage of the comparator 48, an output signal (at an amplitude level of 10 volts, for example) from the clockwise comparator 48 is coupled to a clockwise OR circuit 52 which in turn generates an output (at an amplitude of 10 volts, for example) to gate the power switch control 34. During the operation of the higher error feedback loop 36, it is preferred that the motor 28 be operated at full or maximum velocity and the power switch control 34 is therefore continuously gated as long as the clockwise comparator 48 generates an output signal. When the absolute magnitude of the negative feedback error signal drops below the clockwise comparator set point voltage, the clockwise comparator output drops to zero value and the higher error clockwise loop operation terminates.

In the higher error counterclockwise feedback control loop 42, the counterclockwise comparator 50 is provided with a negative set point voltage (such as −4 volts) and positive feedback error signals having an absolute magnitude in excess of the set point voltage of the counterclockwise comparator 50 to generate an output signal. A counterclockwise OR circuit 54 is coupled between the counterclockwise comparator 50 and the power switch control 34 to produce maximum motor speed during the higher error counterclockwise loop operation. Both OR circuits 52 and 54 are well known commercially available designs.

The total feedback system amplification gain can be 1000 or more, and the common error amplifier 32 can, for example, have a gain of 30 or more without filtering and without amplifying normally encountered noise voltages to the voltage level required for triggering the higher error loop comparator 48 or 50. The higher error-higher velocity loop 36 accordingly provides fast and smooth correctively directed system response only to real errors in excess of the preselected value used to divide higher and lower error values.

When the feedback error signal drops to the point where the higher error loop operation is terminated, the lower error feedback control loop 38 provides the gating control for the power switch control 34 until the demand position is reached. For example, the lower error loop 38 can become operative to produce gating control when the error signal is less than 2% of the maximum possible error signal within the movement boundaries of the load 14.

In the lower error loop 38, a lower error amplifier 54 is connected to the output of the common error amplifier 32 to produce additional gain for the lower error signals. The amplifier 54 can be any suitable well known type such as a transistorized DC operational amplifier with gain control.

The amplifier 54 can have a gain of 15 to 30 or more and filtering circuitry (not shown) can be associated with the amplifier 54 for substantial noise voltage reduction in the lower error feedback loop 38. Relatively slower system response occurs during operation of the lower error feedback loop 38, but the relatively small load movement required for lower error correction does not appreciably extend the total time required for position correction. The combined larger error operation of the higher and lower error feedback loops 36 and 38 and the smaller error operation of the lower error loop 38 alone thus provide for relatively fast position regulation.

Amplified signals from the lower error amplifier 54 are coupled to the inputs of a clockwise comparator circuit 56 and a counterclockwise comparator circuit 58 in the feedback branches 44 and 46, respectively. The comparators 56 and 58 are respectively provided with negative and positive set point voltages for example −4 volts and +4 volts, respectively. When the comparator input voltage has a sign opposite to that of the comparator set point voltage and an absolute magnitude in excess of that of the comparator set point voltage, the comparator 56 or 58 generates an output signal (at a level of 10 volts, for example) to gate an AND circuit 60 in the clockwise branch 44 or an AND circuit 62 in the counterclockwise branch 46. When the AND circuit 60 or 62 is gated by the comparator 56 or 58, pulses P generated by a clock logic system 64 operate the OR circuit 52 or 54 which in turn generates corresponding pulse signals to produce pulsed gating of the power switch control 34. When the lower error amplifier output is too low to actuate the comparator 56 or 58, the position error is at or nearly at zero value and the AND circuit 60 or 62 is ungated to deenergize the motor 28 until a new position error is created.

When the higher error loop 36 is operative, the clock pulse waveform is coupled to the OR circuit 52 or 54 since the lower error loop comparator 56 or 58 is simultaneously operative. However, the continuous signal from the higher error loop comparator 48 or 50 dominates the OR circuit 52 or 54 and a continuous gating signal is applied to the power switch control 34 regardless of the clock pulse rate at error values above the crossover error level. If desired, the higher error loop comparators 48 and 50 can be omitted, and the comparator 56 or 58 then continuously gates the clock logic pulse waveform to the power switch control 34. Position error signals above a predetermined level then result in maximum generation rate of the pulses P and maximum motor speed. Lower position error signals then produce position correction in the manner previously described.

As shown in FIG. 10, the clock logic system 64 can include a capacitor staircase counter 65 and a unijunction transistor pulse generator 67. In this instance, the $\phi 1$ voltage supply line and the neutral voltage supply line are connected to the input of the clock logic system 64. A voltage limiting Zener diode 69 produces a clipped or square waveform $E_2$ which is applied to a transistorized voltage divider 71. An output square waveform $E_3$ from the voltage divider 71 is coupled through an impedance matching network 73 to the counter 65. Each cycle of the $E_3$ voltage waveform, and hence each cycle of the $\phi 1$ voltage waveform, results in storage of a voltage increment on counter capacitor 75. The capacitor voltage thus rises in a staircase manner until the firing voltage level of unijunction transistor 77 is reached precisely at the beginning of a cycle of the $E_3$ and $\phi 1$ voltage waveforms.

When the unijunction transistor 77 is fired, capacitor current rapidly discharges through the transistor emitter and base terminals and through resistor 79. The resultant sharp pulse is coupled to a time delay circuit 81 which produces a pulse P of longer duration at output terminal 83. The capacitor 75 is then set for a new voltage build-up for generating the next pulse P.

Successive pulses P are thus in synchronism with successive cycles of the $\phi 1$ voltage waveform. Synchronization facilitates controlling the duration of the three-phase supply voltage pulses as applied to the motor and in particular facilitates maintaining successive motor pulses of equal duration.

An absolute value circuit 66 (FIG. 2) of suitable design is coupled between the common error amplifier 32 and terminal 85 of the clock logic voltage divider 71 to produce a fixed sign bias voltage which controls the voltage developed across transistor 87 and fixed resistor 89, i.e., $E_3$. Thus, the rate at which voltage builds up on the counter capacitor 75 is proportional to the absolute error feedback signal, and the number of $\phi 1$ cycles required to produce a pulse P is thus determined.

In order to gate the power switch control 34 so as to produce full motor pulses, successive pulses P preferably have equal durations which are preferably greater than one-half cycle and less than one full cycle of the supply voltage waveform. In this manner, each resultant full motor pulse substantially comprises a full three-phase voltage cycle (FIG. 3A) and excellent drive torque and position regulating performance are realized. However, the duration of the pulses P can have other values, for example to produce half-cycle (FIG. 3B) or double cycle gating of full pulses to the motor 28. The duration of the pulses P is suitably varied to achieve the varied full pulsing schemes, for example the design parameters of the time delay circuit 81 can be modified to vary the P pulse width.

Figure 9:
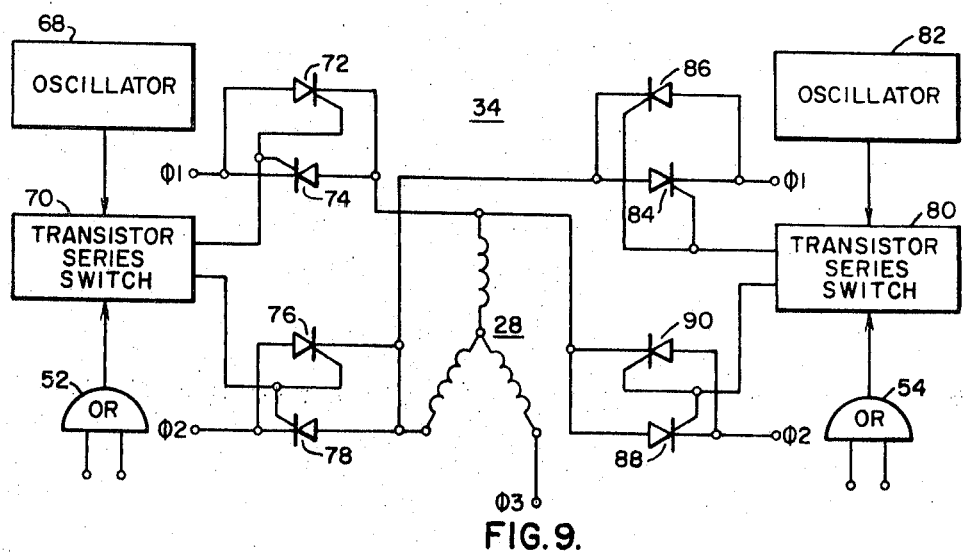
FIG. 9 shows an exemplary form of a three-phase power switch used in the systems of FIGS. 2 and 8.
Figure 4:
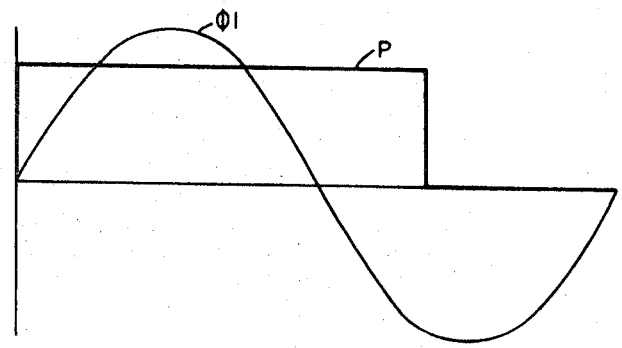
FIGS. 4-7 show various waveforms illustrating the operation of a motor pulse rate control in the motor control system.

An exemplary form of the three-phase power switch control 34 is illustrated in FIG. 9. One of the phase lines $\phi 3$ is directly connected to the motor primary. Each of the other phase lines $\phi 1$ or $\phi 2$ is connected to the motor primary through solid state switches such as the illustrated thyristors or silicon controlled rectifiers.

For clockwise motor operation, an oscillator 68 generates a signal at a frequency such as 1000 c.p.s. which is gated to SCR switches 72, 74, 76 and 78 by a transistor series switch 70 when a clockwise signal is received from the clockwise OR circuit 52. The gated SCR switches 72, 74, 76 and 78 apply the potential on phase lines $\phi 1$ and $\phi 2$ to the motor primary to produce torque generating current flow therein until the clockwise signal is removed from the transistor switch 70 and the SCR switches revert to the cutoff state.

For counterclockwise motor operation, the same procedure is employed except that a transistor series switch 80 controls the application of the output from an oscillator 82 in gating SCR switches 84, 86, 88 and 90 in response to a counterclockwise signal from the OR circuit 54. Thus, the direction of motor rotation is determined by the motor primary winding terminals to which the phase lines $\phi 1$ and $\phi 2$ are connected as controlled by the transistor switches 70 and 80.

When the higher error loop 36 is in operation, all of the SCR switches 72, 74, 76, 78 or 84, 86, 88, 90 in the power switch control 34 are gated and the entire supply voltage waveform is continuously applied to the motor 28. When the lower error loop 38 is in operation, the transistor switch 70 or 80 is operated to produce a full motor pulse in response to each pulse P in the clock pulse waveform. In the preferred system, a clock pulse P occurring at the start of a half-cycle of the $\phi 1$ voltage waveform (as indicated by reference character 101 in FIG. 3A) and coupled to the power switch control 34 through the OR circuit 52 causes the switches 72, 74, 76 and 78 to be gated. All three-phase voltages $\phi 1$, $\phi 2$, and continuously applied $\phi 3$ are thus applied to the motor 28. Corresponding inductively lagging phase currents $i_1$, $i_2$, and $i_3$ flow through the gated and fired SCR switches and the motor primary. The pulse P continues into the next negative half-cycle of the $\phi 1$ voltage waveform and is terminated to end the gating period as indicated by reference character 103. All three-phase currents continue flowing after gating turnoff until respective current zeroes are realized at which time the SCR's are turned off. Since the $i_2$ current terminates substantially as the $\phi 1$ voltage cycle is just being completed (105), a substantially full cycle three-phase voltage pulse is applied to the motor 28. Currents $i_1$ and $i_3$ continue flowing for approximately another ¼ cycle (to 107), but have little effect on torque production. If a pulse P is produced at the beginning of each $\phi 1$ cycle, all three phase voltages are continuously applied to the motor 28. Other P pulse rates result in other time functions of motor voltage application, for example a P pulse rate of one per two supply voltage cycles results in a new gating period starting at 109. Other examples are described in connection with FIGS. 4–7. If the employed power switches have turnoff characteristics different from the described current turnoff, different motor voltage waveforms will be realized for a predetermined P pulse width. However, the P pulse width can readily be varied to obtain the desired character for the full motor pulses irrespectively of the switch turnoff characteristics.

Figure 3B:
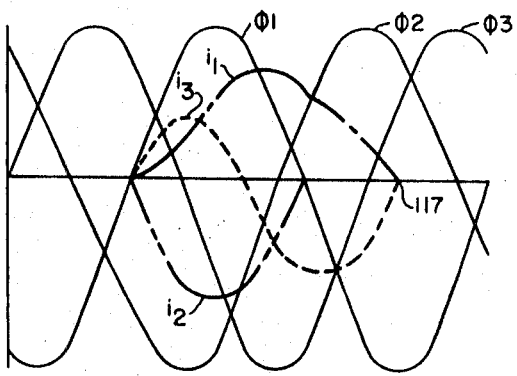

In FIG. 3B, there is shown another example of the manner in which full voltage supply pulses can be switched to the motor 28. In this case, the gating period starts at 111 and briefly continues to phase point 113 as determined by a short duration P pulse. The $i_2$ current is the first to reach a current zero at 115 which is about ½ cycle after the start of gating. Currents $i_1$ and $i_3$ continue approximately until phase point 117. A full motor pulse in this case thus comprises about a full half cycle three phase voltage pulse.

In alternate forms of the invention, the power switches in the power switch control 34 can be gated in phase sequence to produce full motor pulses with predetermined phase delay between the successive phase gatings. If desired, the same clock pulse can be used for both phase gatings with well-known delay circuitry (not shown) used to delay the gating of the lagging switch.

Figure 5:
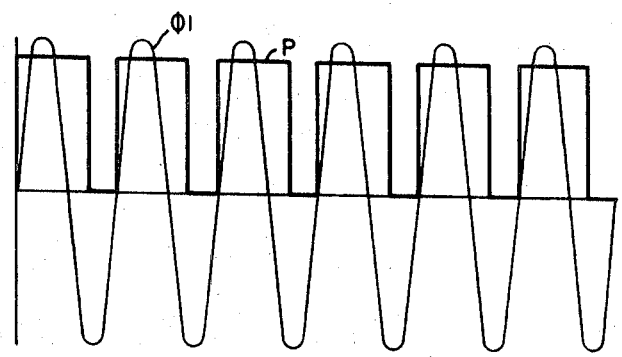
Figure 6:
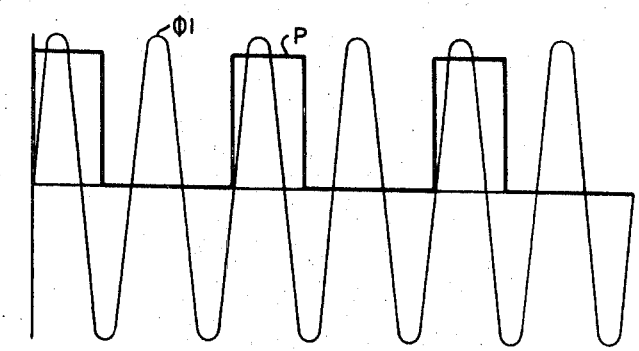
Figure 7:
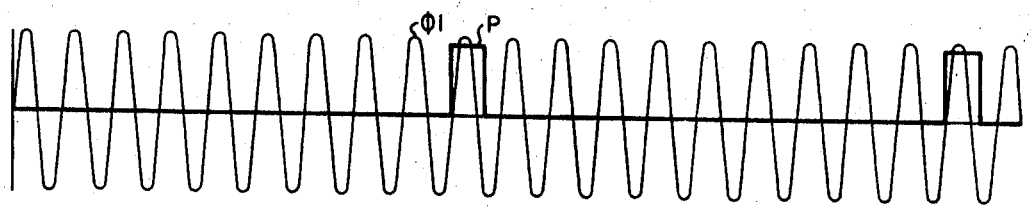

In FIGS. 4–7, there are shown curves demonstrating different pulse rates $P_f$ for different level position error signals at the terminal 85 (FIG. 2). In this case, as in the case of FIG. 3A, the duration of each pulse P in the clock waveform is equal to about ¾ of a full cycle of phase voltage $\phi 1$ of the supply voltage waveform to produce full or nearly full cycle gating as previously described. In FIG. 5, a pulse P is generated at the start of each positive half cycle of the phase voltage $\phi 1$ and the resultant effective voltage applied to the motor 12 produces full motor speed and is equal to that stemming from continuous application of the three phase supply voltage waveform such as during operation of the higher error-higher velocity error loop 36 or just as the higher error loop 36 shuts down for lower error loop crossover. In FIGS. 6 and 7, the pulse rate $P_f$ is respectively one pulse per 2 and one pulse per 10 cycles of phase voltage $\phi 1$ in correspondence with successively lower feedback error signals and lower motor speeds of ½ and ⅒ full speed.

In the sample system from which the curves in FIGS. 4–7 were obtained, the feedback position error signal resulting in the pulse rate $P_f$ in FIG. 7 was just sufficient to produce an output signal from the lower error amplifier 54 to operate the comparator 56 or 58 and the AND gate 60 or 62 thereby to apply some electrical energy to the motor 12 for position correction. The FIG. 7 pulse rate $P_f$ corresponded to a minimum correction rate condition where load position was very close to demand position and the motor was operated at ⅒ of its full speed until it reached the demand position. Any smaller position error signal corresponded to the load being essentially in position so that the gating pulses P were logically withheld from the power switch control as previously described, i.e. the resolution limit of the system barred further corrective movement and the motor 28 was de-energized.

If it is desired to operate the positioning motor control system 26 in the manual mode, the feedback loop can be opened and a manually controlled signal can be employed to drive the clock logic system 64 which is directly coupled to the power switch control 34. Reference is made to a copending application entitled Variable Speed Control for Position Regulator Motors, filed by Lyle F. Martz on Jan. 27, 1966, Ser. No. 523,422, and assigned to the present assignee for disclosure of a unique manual mode control which can be used with the system 26.

In summary of the operation of the control system 26, higher position errors result in correction at maximum velocity and lower position errors result in correction at lower velocity preferably at a rate proportional to the magnitude of the position error. At lower error conditions, a variable gating pulse rate $P_f$ determines the rate at which full voltage supply pulses are applied to the motor 12. As the gating pulse rate $P_f$ decreases with diminishing feedback error, the motor energization pulses become more spread in time and the effective voltage applied to the motor 12 decreases to drop the motor speed.

Extremely smooth positioning movement for a wide variety of motor sizes is produced by the system 26 in many load applications by virtue of the variable rate and full motor pulsing operation in combination with either large or small inertial effects. Best smoothness is obtained when the successive motor pulses, regardless of their time spacing, are about equal in duration to produce substantially equal successive torque pulses on the motor shaft. The operational smoothness exists from the start of movement through the movement period as the full motor pulse rate decreases toward zero at the end of movement with the load 14 accurately located at the demand position.

The multilevel of multiloop feedback error operation and the pulse rate feedback control feature are instrumental in producing improved system resolution consistently with fast, smooth and stable operation with essentially no position overshoot. In one application where a three-phase 900 r.p.m. induction motor was used with downgearing to drive a load through an arc of 90°, the system gain was about 1000 and resolution better than 0.1% was obtained without overshoot and with full arc movement in about 5 seconds or less.

As a side benefit, the full pulse character of the motor energization waveform can result in optimum induction motor efficiency in converting electric energy to mechanical torque-speed energy. Further, high noise immunity is obtained as a result of multiloop feedback error operation, and overall cool operation is generally obtained since only low average power is used in the lower error loop operation which covers most in-process position changes in many applications.

The positioning motor control system has excellent performance characteristics in lower and higher power applications. Since it is especially adaptable for use with AC motors and particularly three-phase squirrel cage induction motors, more expensive DC motors are not required and capital cost economy is realized in many applications. System operation is generally economic and reliable since no mechanical components such as motor brushes and relays are required thereby facilitating maintenance.

Another embodiment of the invention is shown in the form of a positioning induction motor control system 102 in FIG. 8. It includes velocity control as an operating feature, and is particularly useful where heavy or directionally imbalanced loads are being driven since the position correction rate is made independent of load characteristics.

In the system 104, feedback position loops are employed with comparators and gates to control the application of full supply voltage pulses to the motor 28 through the power switch control 34 in a manner similar to that described for FIG. 2, and like reference characters are accordingly employed for like elements in the two figures. The clock logic system 64 is again employed under control by the absolute value circuit 66. Higher position errors again result in maximum velocity correction by operation of the comparator 48 or 50 through OR circuit 52 or 54. Lower position errors are corrected at lower velocity by operation of the comparator 56 or 58 through AND circuit 60 or 62 and OR circuit 52 or 54.

To produce velocity control, a velocity control feedback loop 106 includes a speed signal generating system such as a commercially available tachometer 108 coupled to the motor shaft. The DC speed signal is applied to the input of a velocity error controller or integrator 110, such as a high gain DC transistorized integrating amplifier, which is cascaded with the common position error amplifier 32. The position error signal from the amplifier 32 accordingly operates as the reference velocity set point for the integrator 110. The output signal from the integrator 110 represents the time integrated difference between the variable position error signal set point and the velocity feedback signal. The integrator 110 drives the absolute value circuit 66 so as to control the rate of generation of the pulses P.

If clockwise motor velocity is less than that called for by the position error, the integrator output has one polarity (such as positive) and increases until the increasing pulse rate $P_f$ brings the velocity in line with the position error. A high gain comparator amplifier 114 of any well known design is coupled to the integrator output and generates a signal E of logic value 1 only when excessive clockwise velocity causes the integrator output to acquire a negative value. The comparator amplifier output is connected to the clockwise position comparators 48 and 56, and, when the signal is $E=1$, the comparators 48 and 56 are disabled to withhold gating of the clockwise OR circuit 52 and correspondingly to withhold motor energization in the clockwise direction. Braking is simultaneously applied as subsequently described.

Similarly, if counterclockwise velocity is less than that called for by the position error, the integrator has a negative output and increases absolutely until the increasing pulse rate $P_f$ bring the velocity in line with the position error. A standard NOR circuit 118 is coupled to the output of the comparator amplifier 114 and generates a signal F of logic value 1 only when excessive counterclockwise velocity causes the integrator output to acquire a positive value. The NOR circuit output is connected to the counterclockwise position comparators 50 and 58. When the signal $F=1$, the comparators 50 and 58 are disabled by the signal F to withhold gating of the counterclockwise OR circuit 54 and correspondingly motor energization in the counterclockwise direction. Braking is simultaneously applied.

A plugging braking control 112 in the velocity control produces motor slowdown when required by excessive velocity. In general, excessive velocity can tend to be caused for example by a directionally imbalanced load which is being driven in the direction in which it pulls the motor 28. As another example, excessive velocity could tend to be caused by a balanced high inertia load.

In the braking control 112, a time delay circuit 117 is connected to the clock system 64 to generate Q pulses having a relatively short time duration and synchronized with the P pulses. Since the pulse rate $Q_f$ depends on the pulse rate $P_f$, it is also determined by the amplitude of the velocity error output signal. The Q pulses gate AND circuits 116 and 120 and produce short duration pulses at the outputs of the OR circuits 54 and 52 when the E and F signals respectively equal logic 1 value. When excessive clockwise velocity causes the signal E to reach logic 1 value, clockwise drive is prevented as previously described and gated Q pulses cause the OR circuit 54 to gate supply voltage pulses to the motor 28 which produce a counterclockwise braking torque. Braking terminates as velocity is reduced to switch the sign of the integrator output. A clockwise braking torque is similarly produced to offset excessive counterclockwise velocity. Thus, counterclockwise drive is prevented when $F=1$ and gated Q pulses cause operation of the clockwise OR circuit 52. It is noted that Q pulses are gated along with P pulses to the OR circuits 52 and 54 by the F and E signals during no braking periods, but the Q pulses have a short duration and accordingly have no effect upon the motor drive energization waveform.

During higher position error loop operation, the motor velocity is maximum, and the plugging braking control 112 normally is not needed but does prevent overspeed operation under some conditions. When the lower position error loop is in operation, the character of the motor energization waveform is varied by the velocity and braking control to produce smooth, stable, fast and high resolution position correction at a controlled decreasing rate independently of load torque. A resolution as great as .05% or better is characteristically realized. When demand position is reached, static DC energization can be suitably used to lock the load in position if the load is directionally imbalanced and if an anti-back drive device is not used in the coupling between the motor and the load.

If it is desired to operate the induction motor 28 as a speed controlled motor, the position control 104 including the comparators 48, 56 and 50, 58 and all of the AND and OR gating circuits and the braking control 112 are omitted and the velocity control 106 is provided with a set point to produce a speed error signal at the output of the amplifier 110 in regulating the induction motor 28 to a predetermined speed. The pulse rate P is varied by the speed error signal to control the rate at which full motor energization pulses are applied to the induction motor 28 thereby to control the motor speed.

The foregoing description has been presented only to illustrate the principles of the invention. Accordingly, it is desired that the invention not be limited by the embodiments described, but, rather, that it be accorded an interpretation consistent with the scope and spirit of its broad principles.

What is claimed is:

1. An alternating current motor control system for regulating the position of a load driven by an alternating current motor, said system comprising a power switch circuit for controlling the application of an AC supply voltage waveform to the motor, means for sensing the load position, means for operating said power switch circuit to apply full supply voltage pulses to the motor at a variable rate dependent on the position error level as the load is moved toward the set point position, said operating means including a clock system and a pulse generator, said clock system directly responsive to the supply voltage to operate said pulse generator so as to generate pulses synchronously with cycles of the AC supply voltage waveform, and electronic means for controlling said clock system in response to the position error level so as to control the rate at which the synchronous pulse generator pulses are generated for coupling to said power switch circuit.

2. An alternating current motor control system for regulating the position of a load driven by a three-phase induction motor mechanically coupled to the load, said system comprising a power switch circuit for controlling the application of an AC supply voltage waveform to the motor, means for sensing the load position, means for sensing the motor speed, means for operating said power switch circuit to apply full supply voltage pulses to the motor at a variable rate dependent on the position error level and the motor velocity so that the load is positioned at controlled velocity, said power switch circuit including a plurality of phase switches connected to control the flow of phase currents and the direction of current flow for motor rotational direction control, said operating means including a plugging braking control, and said operating means further including means for controllably gating said phase switches sequentially in accordance with the braking control output when velocity is excessive and in accordance with the sign of the position error when velocity is not excessive.

3. An alternating current motor control system for regulating the position of a load driven by an alternating current motor, said system comprising a power switch circuit for controlling the application of an AC supply voltage waveform to the motor, means for sensing the load position, means for sensing the motor speed, means for operating said power switch circuit to apply full supply voltage pulses to the motor at a variable rate dependent on the position error level and the motor velocity so that the load is positioned at controlled velocity, said operating means including a clock system and a pulse generator, said clock system operating said pulse generator to generate pulses synchronously with cycles of the AC supply voltage waveform, and means for controlling said clock system in response to the position error level and the velocity so as to control the rate at which the synchronous pulse generator pulses are coupled to said power switch circuit.

4. A positioning alternating current motor control system as set forth in claim 1, wherein said system further includes a three-phase squirrel cage induction motor mechanically coupled to the load and controllably operated by said power switch circuit, said power switch circuit includes a plurality of phase switches operated to provide full motor energization pulses, and said pulse generator is synchronized with one phase voltage of the supply voltage waveform and controlled by said clock system to produce synchronous power switch gating pulses having a duration in excess of a half cycle of the supply voltage and less than a full cycle of the supply voltage.

5. A positioning alternating current motor control system as set forth in claim 1 wherein said operating means further includes a higher error control branch continuously gating said power switch circuit to operate the motor substantially at rated maximum velocity over a higher error range, and a lower error control branch for gating the output of said pulse generator to said power switch circuit over a lower error range.

6. A positioning alternating current motor control system as set forth in claim 5 wherein a position error amplifier is commonly connected in said control branches, said higher error control branch includes logic circuitry coupled to said amplifier and operating said power switch circuit to apply substantially the entire supply voltage waveform to the motor over the higher error range, said lower error control branch includes a second amplifier coupled to said common amplifier, and said lower error control branch further includes logic circuitry coupled to said second amplifier and said pulse generator to gate the output of said pulse generator to said power switch circuit over the lower error range.

7. A positioning alternating current motor control system as set forth in claim 6 wherein said system further includes a three-phase induction motor mechanically coupled to the load and controllably operated by said power switch circuit, said power switch circuit includes a plurality of phase switches connected to control the flow of phase currents and the direction of current flow for motor rotational direction control, and said logic circuitry in said higher error control branch and said logic circuitry in said lower error control branch each includes separate clockwise and counterclockwise logic circuits for controllably gating said phase switches sequentially in accordance with the sign of the position error.

8. A positioning alternating current motor control system as set forth in claim 3 wherein said operating means further includes a plugging braking control operating said power switch circuit to apply supply voltage braking pulses to the motor when corrective velocity is excessive.

9. A positioning alternating current motor control system as set forth in claim 3 wherein said clock system controlling means includes means for detecting position error, means for detecting velocity error with reference to the output of said position error detecting means, means coupling the output of said velocity error detecting means to said clock system for pulse rate control, and said operating means further including circuit means responsive to said position error detecting means for applying gating control to said power switch circuit.

10. A positioning alternating current motor control system as set forth in claim 9 wherein said dynamic braking control includes means responsive to said pulse generator for generating braking logic pulses, and logic circuit means for coupling said braking logic pulses through said position error responsive means to apply voltage supply braking pulses to the motor when velocity is excessive.

References Cited

UNITED STATES PATENTS

| | | | |
|---|---|---|---|
| 3,307,094 | 2/1967 | Ogle | 318—341 |
| 2,419,812 | 4/1947 | Bedford. | |
| 3,150,303 | 9/1964 | James et al. | |
| 3,242,407 | 3/1966 | Hansen. | |
| 3,355,654 | 11/1967 | Risberg | 318—227 XR |

ORIS L. RADER, Primary Examiner

THOMAS E. LYNCH, Assistant Examiner

U.S. Cl. X.R.

318—28, 227, 230, 341